(12) United States Patent
Nakaya et al.

(10) Patent No.: US 7,243,995 B2
(45) Date of Patent: Jul. 17, 2007

(54) SEAT STRUCTURE FOR VEHICLE (75) Inventors: Kouichi Nakaya, Hiroshima (JP); Kenji Muramatsu, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 44 days.

(21) Appl. No.: 10/859,317

(22) Filed: Jun. 3, 2004

(65) Prior Publication Data
US 2004/0256901 A1    Dec. 23, 2004

(30) Foreign Application Priority Data

| Jun. 20, 2003 | (JP) | ............................ 2003-176109 |
| Jun. 20, 2003 | (JP) | ............................ 2003-176135 |
| Jun. 20, 2003 | (JP) | ............................ 2003-176152 |

(51) Int. Cl.
*B60N 2/48* (2006.01)
(52) U.S. Cl. .............................. 297/378.1; 297/378.12; 297/311; 297/344.11
(58) Field of Classification Search ............. 297/378.1, 297/378.12, 378.13, 344.1, 311 X, 331, 344.11; 296/65.1; 248/429, 430
See application file for complete search history.

(56) References Cited

U.S. PATENT DOCUMENTS

| 4,045,082 A | * | 8/1977 | Egert et al. .................. 297/357 |
| 5,542,745 A | | 8/1996 | Takeda et al. |
| 5,570,931 A | * | 11/1996 | Kargilis et al. ......... 297/378.12 |
| 5,918,940 A | * | 7/1999 | Wakamatsu et al. ......... 297/410 |
| 6,145,910 A | * | 11/2000 | Baldas et al. ............. 296/65.01 |
| 6,336,679 B1 | * | 1/2002 | Smuk ..................... 297/378.12 |
| 6,402,250 B1 | * | 6/2002 | Lange .................... 297/378.12 |
| 6,616,230 B2 | * | 9/2003 | Niikura ....................... 297/311 |
| 6,679,536 B1 | * | 1/2004 | Sonnenberg et al. ..... 296/65.09 |

FOREIGN PATENT DOCUMENTS

| EP | 0588693 | * | 9/1993 |
| FR | 02-735-081 | | 12/1996 |
| FR | 2735081 | * | 12/1996 |
| JP | 58-67526 | * | 4/1983 |
| JP | 10-203210 | | 8/1998 |
| JP | 2003-118438 | | 4/2003 |
| WO | WO-02/100678 | | 12/2002 |

* cited by examiner

*Primary Examiner*—Laurie K. Cranmer
(74) *Attorney, Agent, or Firm*—Nixon Peabody LLP; Donald R. Studebaker (57) ABSTRACT

A second row seat is guided by a vehicle-longitudinal-direction sliding mechanism and a vehicle-width-direction siding mechanism supported on the vehicle-longitudinal-direction sliding mechanism. The vehicle-width-direction sliding mechanism is configured such that a length thereof is set within a width of a recess portion formed at the bottom face of a seat cushion so as to allow the vehicle-width-direction sliding mechanism to be placed within the recess portion when the seat cushion has been moved forward and downward by a moving mechanism. Accordingly, a load floor formed by a back face of a seat back according to a forward movement of the seat back with its lower and horizontal position can be obtained.

14 Claims, 6 Drawing Sheets

SEAT STRUCTURE FOR VEHICLE

BACKGROUND OF THE INVENTION

The present invention relates to a seat structure for a vehicle, and more specifically to a seat structure for a vehicle in which a seat is capable of sliding in a vehicle longitudinal direction and a vehicle width direction.

Conventionally, a seat structure in which a seat, particularly a second row seat is configured so as to slide in the vehicle longitudinal direction and the vehicle width direction to improve utility of the seat is known.

Further, as such a seat structure in which the seat is capable of sliding slide in the vehicle longitudinal direction and the vehicle width direction, a seat structure (so-called long slide) in which there is provided a long sliding distance in the vehicle longitudinal direction to materialize a variety of seat arrangements is also known. In this case, a vehicle-longitudinal-direction slide rail should be longer than a vehicle-width-direction slide rail. Accordingly, the following structure is considered preferable to provide a proper supporting rigidity of sliding mechanisms. Namely, a vehicle-longitudinal-direction sliding mechanism is disposed on a vehicle floor, a vehicle-width-direction sliding mechanism is supported on this vehicle-longitudinal-direction sliding mechanism so as to slide on it, and a vehicle seat is supported on the vehicle-width-direction sliding mechanism. An example of this type of seat sliding mechanism is disclosed in Japanese Laid-Open Patent Publication No. 10-203210.

Meanwhile, there is also a need as a variation of seat arrangements that a seat is configured such that a seat back is folded on a seat cushion to provide a space for a load compartment above a back face of the seat back. However, simply rotating the seat back about one rotational axis forward could not provide the seat back with its horizontally-positioned back face when the seat back has been folded because of shapes of the seat cushion and the seat back. Accordingly, a certain design that a front of the seat cushion is lowered a little according to a forward rotation of the seat back is necessary when this kind of foldable seat is used.

Namely, in the case where the foldable seat is combined with the structure (a structure materializing both a so-called long slide and a vehicle-width-direction slide of a seat) disclosed in the above-described patent document to improve the seat utility further, the vehicle-longitudinal-direction sliding mechanism, the vehicle-width-direction sliding mechanism and the mechanism lowering the seat cushion need to be interposed between the vehicle floor and the seat. However, since the seat cushion is lowered when the seat is folded, there occurs a problem that the vehicle-width-direction sliding mechanism interferes with the seat cushion being lowered. Meanwhile, there exists an idea that the seat cushion and the seat back are connected through a double-hinged mechanism in order to provide the seat back with its horizontally-positioned back face when the seat back has been folded by avoiding the interference of the vehicle-width-direction sliding mechanism with the seat cushion. However, there would occur another problem that a height of a floor face of a load compartment which is formed above the back face of the seat back is high improperly.

Further, in the case where a lowering mechanism for the seat cushion is disposed below the seat cushion, particularly around a rear end of the seat cushion below the seat cushion, an enough thickness of the seat cushion would not be obtained, thereby deteriorating comfortable sitting of the seat.

SUMMARY OF THE INVENTION

The present invention has been devised in view of the above-mentioned problems. An object of the present invention is to materialize a seat structure for a vehicle, in which a vehicle-longitudinal-direction sliding mechanism is disposed on a vehicle floor, a vehicle-width-direction sliding mechanism is supported on the vehicle-longitudinal-direction sliding mechanism so as to slide on it, and a vehicle seat is supported on the vehicle-width-direction sliding mechanism, which can provide a load floor having its lower and horizontal position which is formed by a back face of a seat back of the seat according to a forward movement of the seat back. Furthermore, another object of the present invention is to materialize the above-described seat structure for a vehicle which can obtain an enough thickness and thereby comfortable sitting of a seat cushion of the seat.

In order to achieve the above-described object, the first aspect of the present invention provides a seat structure for a vehicle comprising a seat disposed in a passenger compartment of the vehicle and including a seat cushion and a seat back, the seat being configured such that its seat back is capable of being folded on the seat cushion with the back facing upward, a vehicle-width-direction sliding mechanism disposed below the seat and guiding the seat so as to allow the seat to slide in a vehicle width direction, a vehicle-longitudinal-direction sliding mechanism guiding the vehicle-width-direction sliding mechanism so as to allow the vehicle-width-direction sliding mechanism to slide in a vehicle longitudinal direction in the passenger compartment of the vehicle, wherein the seat is configured so as to be guided in both vehicle width direction and vehicle longitudinal direction by the vehicle-width-direction sliding mechanism and the vehicle-longitudinal-direction sliding mechanism, a recess portion formed at the bottom face of the seat cushion of the seat, and a moving mechanism disposed between the seat and the vehicle-width-direction sliding mechanism and moving the seat cushion of the seat forward and downward according to a movement of the seat back to be folded on the seat cushion, wherein the vehicle-width-direction sliding mechanism is configured such that a length thereof is set within a width of the recess portion in the vehicle width direction so as to allow the vehicle-width-direction sliding mechanism to be placed within the recess portion when the seat cushion of the seat has been moved forward and downward by the moving mechanism.

According to the first aspect of the present invention, the seat structure for a vehicle, in which the vehicle-longitudinal-direction sliding mechanism is disposed on the vehicle floor, the vehicle-width-direction sliding mechanism is supported on the vehicle-longitudinal-direction sliding mechanism so as to slide on it, and the vehicle seat is supported on the vehicle-width-direction sliding mechanism, which can provide the load floor having its lower and horizontal position which is formed by the back face of the seat back of the seat according to the forward movement of the seat back can be materialized. Namely, in general a recess portion is formed at a lower portion of the seat, specifically the bottom face of the seat cushion. Accordingly, the vehicle-width-direction sliding mechanism can be placed within the recess portion, by setting the length of the vehicle-width-direction sliding mechanism within the width of the recess portion and moving the seat cushion forward and downward when the seat back has been moved forward so as to make the back face of the seat back in the horizontal position.

The second aspect of the present invention provides the seat structure for a vehicle of the first aspect of the invention, wherein the seat back of the seat is supported pivotally at a pivotal portion fixed to the vehicle-width-direction sliding mechanism so as to allow the seat back to be folded on the seat cushion with its back facing upward, the seat cushion of the seat is supported pivotally on a portion of the seat back which is located above the pivotal portion, thereby moving the seat cushion of the seat forward and downward according to the movement of the seat back to be folded on the seat cushion, and a linkage mechanism guiding the downward-and-forward movement of the seat cushion is interposed between the bottom face of the seat cushion and the vehicle-width-direction sliding mechanism.

According to the second aspect of the present invention, since the seat cushion is guided forward and downward by simply moving the seat back forward to be folded, a seat arrangement in which the back face of the seat back forms a substantially horizontal load floor can be provided easily.

The third aspect of the present invention provides the seat structure for a vehicle of the first aspect of the invention, wherein the seat cushion of the seat is configured to be detachable from the vehicle-width-direction sliding mechanism and supported pivotally at a rear end portion thereof so as to move upward about its rear end portion, and the seat is configured such that the seat cushion takes further a substantially contacted position with the seat back when being moved upward about the rear end portion and being in a substantially upright position.

According to the third aspect of the present invention, a portion at which the seat cushion is located in its sitting available position can be used as a load compartment by putting the seat cushion in the substantially contacted position with the seat back when moving upward about the rear end portion and being in the substantially upright position. Further, by rotating forward the seat cushion and the seat back integrally from the position, the substantially horizontal load floor can be formed by the back face of the seat back.

The fourth aspect of the present invention provides the seat structure for a vehicle of the first aspect of the invention, wherein the vehicle-width-direction sliding mechanism includes a front vehicle-width-direction sliding mechanism and a rear vehicle-width-direction sliding mechanism which are disposed away from each other in the vehicle longitudinal direction below the seat cushion, the front vehicle-width-direction sliding mechanism is configured such that a length thereof is set within the width of the recess portion in the vehicle width direction, and the rear vehicle-width-direction sliding mechanism supports the seat back of the seat so as to allow the seat back to be folded on the seat cushion.

According to the fourth aspect of the present invention, the rear vehicle-width-direction sliding mechanism supporting a rear side of the seat supports not the seat cushion but the seat back, and only the front vehicle-width-direction sliding mechanism supporting a front side of the seat is placed in the recess portion when the seat back has been moved forward so as to put the back face of the seat back in the horizontal position. Accordingly, the recess portion can be formed at the bottom face of the seat cushion to accommodate only the front vehicle-width-direction sliding mechanism in it, and there is no necessarily need that a recess portion is formed at the bottom face of a rear portion of the seat cushion which may effect on comfortable sitting.

Thus, the seat structure providing the load floor having its lower and horizontal position which is formed by the back face of the seat back according to the forward movement of the seat back can be materialized without deteriorating any comfortable sitting of the seat.

The fifth aspect of the present invention provides the seat structure for a vehicle of the first aspect of the invention, wherein the vehicle-width-direction sliding mechanism includes a front vehicle-width-direction sliding mechanism and a rear vehicle-width-direction sliding mechanism which are disposed away form each other in the vehicle longitudinal direction, the rear vehicle-width-direction includes a lower rail which extends in the vehicle width direction and is guided to slide in the vehicle longitudinal direction by the vehicle-longitudinal-direction sliding mechanism and an upper rail which is attached to the seat so as to extend in the vehicle width direction, has a U-shaped cross section opening downward, and receives the lower rail therein so as to guide the lower rail, and an anchor for attaching a child seat is fixed to the upper rail.

According to the fifth aspect of the present invention, since it is fixed to the upper rail having the U-shaped cross section and receiving the lower rail of the rear vehicle-width-direction sliding mechanism, the anchor for attaching the child seat is fixed to a member which has relatively large cross section. Accordingly, strength of fixing the anchor for attaching the child seat can be enhanced in the seat structure in which the seat is guided in both vehicle longitudinal direction and vehicle width direction. Further, since the anchor for attaching the child seat is fixed to the upper rail, the seat can be slid in the vehicle width direction along with a child seat on thereon.

The sixth aspect of the present invention provides the seat structure for a vehicle of the fifth aspect of the invention, wherein the upper rail is formed such that its cross section is of a substantially rectangular shape with its longer lateral side, and the anchor for attaching the child seat is fixed to a back face of the upper rail.

According to the sixth aspect of the present invention, since the anchor for attaching the child seat is fixed to the back face of the upper rail having its cross section which is of a substantially rectangular shape with its longer lateral side, a load resistance of the child seat attached by the anchor can be improved. Namely, in the event that a forward impact load is applied to the child seat during a vehicle head-on collision and so on, the anchor fixed on the back face of the upper rail can provide an enhanced load resistance for the child seat.

The seventh aspect of the present invention provides the seat structure for a vehicle of the fifth aspect of the invention, wherein a connecting member is provided to connect the front vehicle-width-direction sliding mechanism with the rear vehicle-width-direction sliding mechanism.

According to the seventh aspect of the present invention, since the front vehicle-width-direction sliding mechanism and the rear vehicle-width-direction sliding mechanism are connected by the connecting member, a vehicle-longitudinal-direction load applied to the anchor for attaching the child seat can be sustained properly by the front vehicle-width-direction sliding mechanism and the rear vehicle-width-direction sliding mechanism, thereby improving further the load resistance for the child seat.

The eighth aspect of the present invention provides a seat structure for a vehicle comprising, a seat disposed in a passenger compartment of the vehicle and including a seat cushion and a seat back, the seat being configured such that the seat back is capable of being folded on the seat cushion with its back facing upward, a front vehicle-width-direction sliding mechanism and a rear vehicle-width-direction sliding mechanism which are disposed away from each other in a vehicle longitudinal direction below the seat and guide the seat so as to allow the seat to slide in a vehicle width direction, a vehicle-longitudinal-direction sliding mechanism guiding the front and rear vehicle-width-direction sliding mechanisms so as to allow the front and rear vehicle-width-direction sliding mechanisms to slide in the vehicle longitudinal direction in the passenger compartment of the vehicle, wherein the seat is configured so as to be guided in both vehicle width direction and vehicle longitudinal direction by the front and rear vehicle-width-direction sliding mechanisms and the vehicle-longitudinal-direction sliding mechanism, a pivotal portion fixed to the rear vehicle-width-direction sliding mechanism and supporting pivotally the seat back of the seat so as to allow the seat back to be folded on the seat cushion with its back facing upward, a rotational supporting portion supporting pivotally the seat cushion of the seat, which is located above the pivotal portion of the seat back of the seat, a guide portion guiding a movement of the seat cushion of the seat, which is attached to a front end portion of the seat cushion of the seat, wherein the seat back and the seat cushion of the seat are supported through the pivotal portion, the rotational supporting portion and the guide portion such that a movement of the seat back to be folded on the seat cushion allows the seat cushion of the seat to move forward and downward.

According to the eighth aspect of the present invention, in the seat structure in which the seat is guided in both vehicle width direction and vehicle longitudinal direction by the vehicle-longitudinal-direction sliding mechanism and the vehicle-width-direction sliding mechanism supported on the vehicle-longitudinal-direction sliding mechanism and the seat cushion is configured so as to move forward and downward to allow the back face of the seat back to be located in a substantially horizontal position when the seat back has been moved forward on the seat cushion, the structure to move the seat cushion forward and downward by the forward movement of the seat back on the seat cushion can be obtained without being provided below a rear portion of the seat cushion. Thus, an enough thickness of the seat can be maintained and thereby comfortable sitting of the seat can be obtained. Also, the seat cushion can be moved forward and downward according to the forward movement of the seat back on the seat cushion.

The ninth aspect of the present invention provides the seat structure for a vehicle of the eighth aspect of the invention, wherein a connecting member is provided to connect the front vehicle-width-direction sliding mechanism with the rear vehicle-width-direction sliding mechanism.

According to the ninth aspect of the present invention, since the front vehicle-width-direction sliding mechanism and the rear vehicle-width-direction sliding mechanism are connected by the connecting member, both the seat cushion and the seat back can be supported securely by both of the front and rear vehicle-width-direction sliding mechanisms and thereby the forward and downward movement of the seat cushion according to the forward movement of the seat back to be folded on the seat cushion can be made stable. Namely, a stable seat arrangement of the seat back and the seat cushion can be provided without deteriorating any comfortable sitting of the seat.

The tenth or eleventh aspect of the present invention provides the seat structure for a vehicle of the ninth aspect or the eighth aspect of the invention, wherein the front and rear vehicle-width-direction sliding mechanisms are guided by the vehicle-longitudinal-direction sliding mechanism so as to slide in the vehicle longitudinal direction in a state in which the rear vehicle-width-direction sliding mechanism is located higher than the front vehicle-width-direction sliding mechanism and a space is formed between the rear vehicle-width-direction sliding mechanism and a vehicle floor in the passenger compartment.

According to the tenth or eleventh aspect of the present invention, since the rear vehicle-width-direction sliding mechanism is located relatively higher, it can be avoided that the pivotal portion supporting pivotally the seat back becomes large. Namely, since it is necessary for the seat back to be pivotally supported at a relatively high portion in order to enable the seat back to be folded on the seat cushion, locating both the front and rear vehicle-width-direction sliding mechanisms at the same height might cause a problem that the structure materializing the above-described pivotal portion becomes large and thereby free designing of the seat is limited. However, herein the rear vehicle-width-direction sliding mechanism is disposed above and therefore the pivotal portion supporting pivotally the seat back can be made small. Accordingly, free designing of lower portion of the seat back, namely a rear portion of the seat cushion become less limited, and thus appropriate designing taking account of comfortable sitting of the seat and so on, can be achieved. Further, there exists the space between the seat cushion and the vehicle floor, and this can provide below the seat a space for feet of a passenger sitting on a rear seat which is additionally disposed behind the seat. Accordingly, this can also improve comfortable sitting for the passenger sitting on the rear seat.

The twelfth through fourteenth aspects of the present invention have the same features as those of the above-described fifth through seventh aspects of the present invention respectively. Accordingly, these aspects of the present invention perform substantially the same functions and effects as those of the fifth through seventh aspects of the present invention respectively.

The fifteenth aspect of the present invention provides a seat structure for a vehicle comprising a seat disposed in a passenger compartment of the vehicle and including a seat cushion and a seat back, the seat being configured such that the seat back is capable of being folded on the seat cushion with its back facing upward, a front vehicle-width-direction sliding mechanism and a rear vehicle-width-direction sliding mechanism which are disposed away from each other in a vehicle longitudinal direction below the seat and guide the seat so as to allow the seat to slide in a vehicle width direction, a vehicle-longitudinal-direction sliding mechanism guiding the front and rear vehicle-width-direction sliding mechanisms so as to allow the front and rear vehicle-width-direction sliding mechanisms to slide in the vehicle longitudinal direction in the passenger compartment of the vehicle, wherein the seat is configured so as to be guided in both vehicle width direction and vehicle longitudinal direction by the front and rear vehicle-width-direction sliding mechanisms and the vehicle-longitudinal-direction sliding mechanism, a pivotal portion fixed to the rear vehicle-width-direction sliding mechanism and supporting pivotally the seat back of the seat so as to allow the seat back to be folded on the seat cushion with its back facing upward, a rotational supporting portion supporting pivotally the seat cushion of the seat, which is located above the pivotal portion of the seat back of said seat, a connecting portion connecting detachably the seat cushion of the seat with the front vehicle-width-direction sliding mechanism, which is interposed between the seat cushion and the front vehicle-widthdirection sliding mechanism, wherein the seat is configured such that the seat cushion takes further a substantially contacted position with the seat back when being moved upward about the rotational supporting portion and being in a substantially upright position while the connecting portion allows the seat cushion to be detached from the front vehicle-width-direction sliding mechanism.

According to the fifteenth aspect of the present invention, in the seat structure in which the seat is guided in both vehicle width direction and vehicle longitudinal direction by the vehicle-longitudinal-direction sliding mechanism and the vehicle-width-direction sliding mechanism supported on the vehicle-longitudinal-direction sliding mechanism and the seat cushion is configured so as to move forward and downward to allow the back face of the seat back to be located in a substantially horizontal position when the seat back has been moved forward on the seat cushion, a seat arrangement in which the space of the seat cushion is used as a load compartment by moving upward the seat cushion can also be materialized. Particularly, since the rear vehicle-width-direction sliding mechanism is located just below the seat and not located in the above-described space when the seat cushion is moved upward, the utility of the space can be further enhanced. Further, such structure is materialized without providing the structure for moving the seat cushion forward and downward according to the forward movement of the seat back below a rear portion of the seat cushion. Accordingly, comfortable sitting of the seat can be obtained without decreasing the thickness of the rear portion of the seat cushion.

The sixteenth through eighteenth aspects of the present invention have the same features as those of the above-described ninth through eleventh aspects of the present invention respectively. Accordingly, these aspects of the present invention perform substantially the same functions and effects as those of the ninth through eleventh aspects of the present invention respectively.

Further, the ninth through twenty first aspects of the present invention have the same features as those of the above-described fifth through seventh aspects of the present invention respectively. Accordingly, these aspects of the present invention perform substantially the same functions and effects as those of the fifth through seventh aspects of the present invention respectively.

BRIEF DESCRIPTION OF THE DRAWINGS

FIG. 3(a), (b) are schematic side views for showing the second row seat, FIG. 3(a) in a sitting position and FIG. 3(b) in a folded position, according to the above-described embodiment of the present invention.

FIG. 6(a), (b) are schematic side views for showing a second row seat, FIG. 6(a) in a sitting position and an upward-moved position respectively and FIG. 6(b) in a folded position, according to the above-described another embodiment of the present invention.

DETAILED DESCRIPTION OF THE INVENTION

Preferred embodiments of the present invention will be described referring to drawings. Firstly, the first embodiment of the present invention will be described referring to FIGS. 1 through 4.

Figure 1:
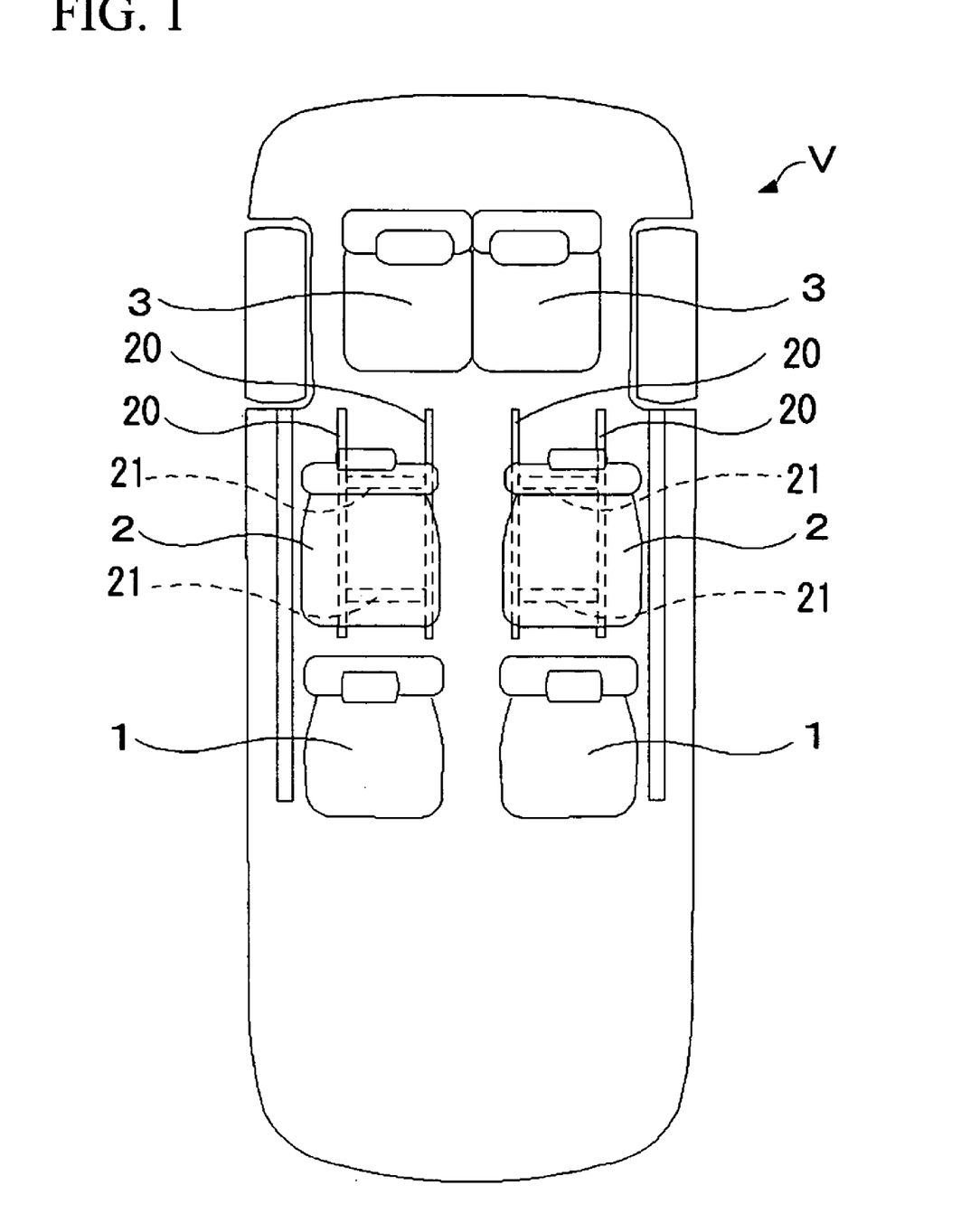
FIG. 1 is a schematic plan view of a vehicle compartment of a vehicle according to a preferred embodiment of the present invention.

FIG. 1 is a schematic plan view of a vehicle compartment of a vehicle V according to the first embodiment of the present invention, the lower side of which corresponds to a forward driving direction of the vehicle. There are provided a first row seat 1 which defines a driver seat and a passenger seat, a second row seat 2 which is disposed behind the first row seat 1, and a third row seat 3 which is disposed behind the second-row seat 2 in a vehicle compartment. Herein, the first embodiment of the present invention is applied to the second row seat 2. The second row seat 2 is comprised of a right-side seat and a left-side seat which are disposed on the right and the left respectively with respect to the forward driving direction of the vehicle. Both the right-side seat and the left-side seat are configured so as to slide in both a vehicle width direction and a vehicle longitudinal direction by a vehicle-longitudinal-direction sliding mechanism 20 and a vehicle-width-direction sliding mechanism 21 which will be described in detail below.

The vehicle-longitudinal-direction sliding mechanism 20, which guides the second row seat 2 so as to allow it to slide in the vehicle longitudinal direction, is substantially comprised of a pair of lower rails (hereinafter, described as the vehicle-longitudinal-direction sliding mechanism 20) extending in the vehicle longitudinal direction which are disposed away from each other in the vehicle width direction for the respective right-side and left-side seats. A pair of vehicle-longitudinal-direction lower rails 20, 20 guide a pair of vehicle-width-direction lower rails 21LF, 21LR (not shown in FIG. 1) which are disposed away from each other in the vehicle longitudinal direction so as to allow the vehicle-width-direction lower rails 21LF, 21LR to slide in the vehicle longitudinal direction. Further, the pair of vehicle-width-direction lower rails 21LF, 21LR guide a pair of vehicle-width-direction upper rails 21UF, 21UR (not shown in FIG. 1) which are disposed below the second row seat 2 so as to allow the upper rails 21UF, 21UR to slide in the vehicle width direction. According to this structure in which the vehicle-width-direction upper rails 21UF, 21UR are guided by the vehicle-width-direction lower rails 21LF, 21LR in the vehicle width direction and these vehicle-width-direction upper rails 21UF, 21UR and lower rails 21LF, 21LR are guided integrally by the vehicle-longitudinal-direction lower rails 20, 20 in the vehicle longitudinal direction, each of the right-side and left-side seats of the second row seat 2 can move in both the vehicle longitudinal direction and the vehicle width direction. Further, there are provided lock mechanisms for locking and unlocking between the vehicle-longitudinal-direction lower rails 20, 20 and the vehicle-width-direction lower rails 21LF, 21LR and positional relationships between the vehicle-width-direction lower rails 21LF, 21LR and the vehicle-width-direction upper rails 21UF, 21UR. The lock mechanisms lock them so as to fix their positions or unlock the fixation, and accordingly the second row seat 2 can be fixed at specified positions in the vehicle longitudinal direction and in the vehicle width direction by these lock mechanisms. Here, detailed descriptions and drawings of the structure of these lock mechanisms are omitted because those are well know in general.

Figure 2:
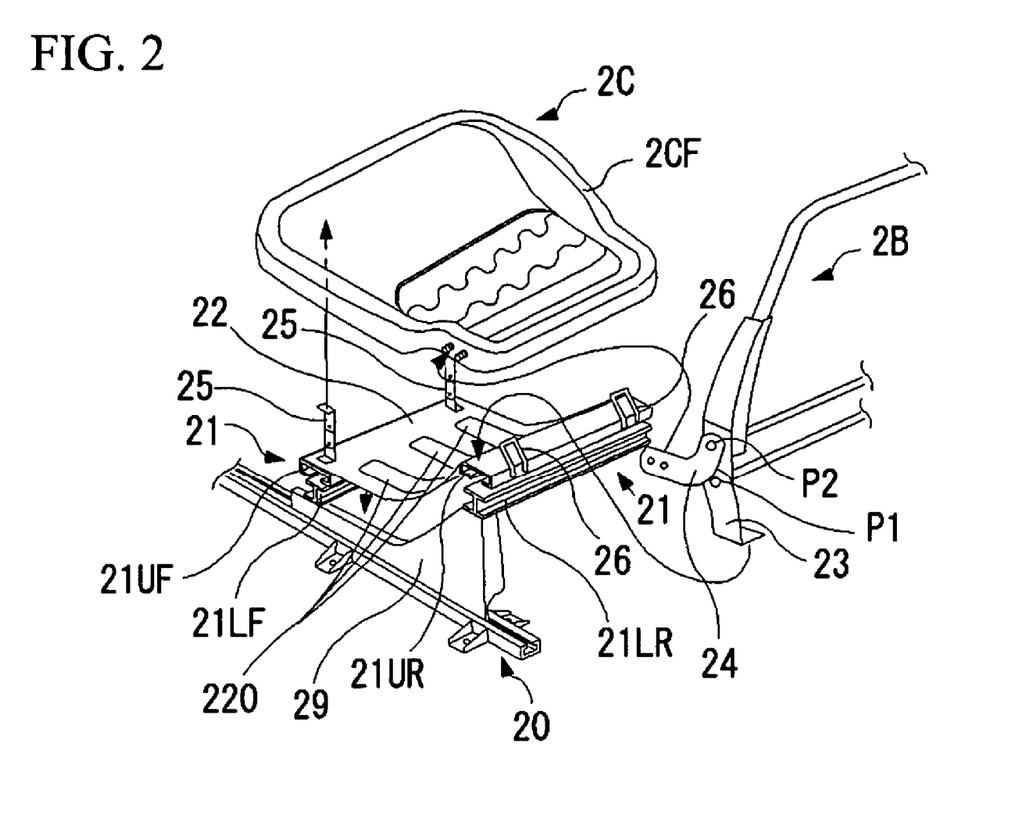
FIG. 2 is an exploded perspective view for showing a vehicle-longitudinal-direction sliding mechanism, a vehicle-width-direction sliding mechanism, and a second row seat according to the above-described embodiment of the present invention.

FIG. 2 is an exploded perspective view for showing the vehicle-longitudinal-direction sliding mechanism 20, the vehicle-width-direction sliding mechanism 21, and the second row seat 2. FIG. 2 shows the left-side seat when viewed from the left and rear side, in which a right-side vehicle-longitudinal-direction sliding mechanism 20 and a right-side half part of a seat back frame are not illustrated herein because those have symmetrical structure with respect to the left-side of them. Further, descriptions and drawings of the right-side seat are omitted here because of its substantially symmetrical structure to the left-side seat. The second row seat 2 is a conventional seat for vehicles in which a frame made of steal is covered by a cushion material like a foaming material, and only its frame is illustrated in FIG. 2, excluding its cushion material.

The above-described vehicle-longitudinal-direction lower rails 20, 20 are disposed on the floor of the vehicle compartment along the forward driving direction of the vehicle V, which guide the vehicle-width-direction lower rails 21LF, 21LR as described above. The vehicle-width-direction lower rails 21LF, 21LR are disposed, as described above, away from each other in the vehicle longitudinal direction, and more specifically, both ends of them are fixed to brackets 29, 29 which are guided by the vehicle-longitudinal-direction lower rails 20, 20 so as to slide. Namely, the pair of parallel-disposed vehicle-width-direction lower rails 21LF, 21LR are configured so as to slide integrally in the vehicle longitudinal direction with the brackets 29, 29 attached thereto which slide along the pair of the vehicle-width-direction lower rails 20, 20. Here, the brackets 29, 29 are formed such that their rear portions have their higher height, and accordingly the rear vehicle-width-direction lower rail 21LR is located in a higher position than the front vehicle-width-direction lower rail 21LF. As a result, a space is formed between the rear vehicle-width-direction lower rail 21LR and the vehicle floor, and this space can be used as a foot space for a passenger sitting on the third row seat 3 behind the second row seat 2, thereby providing comfortable sitting. A sliding mechanism between the vehicle-width-direction lower rails 20, 20 and the brackets 29, 29 can be materialized by using a known bearing mechanism, and accordingly their detailed descriptions and drawings are omitted here.

The vehicle-width-direction lower rails 21LF, 21LR guide the vehicle-width-direction upper rails 21UF, 21UR as described above. The pair of vehicle-width-direction upper rails 21UF, 21UR are provided corresponding to the vehicle-width-direction lower rails 21LF, 21LR, which are fixed to the second row seat 2 as described below. The pair of vehicle-width-direction upper rails 21UF, 21UR are connected with each other by a connecting plate 22. The connecting plate 22 includes beads 220 to increase rigidity thereof, which provides a stable sliding of the second row seat 2 in the vehicle longitudinal direction and also contributes to improvements of stability in a seat arrangement of the second row seat 2 and a load resistance when a load is applied to an anchor 26 for attaching a child seat which will be described below.

The vehicle-width-direction lower rails 21LF, 21LR have their substantially T-shaped cross sections. Meanwhile, the vehicle-width-direction upper rails 21UF, 21UR have their substantially U-shaped cross sections opening downward which encompasses the T-shaped cross sections of the vehicle-width-direction lower rails 21LF, 21LR from above, which have greater rigidity than that of the lower rails 21LF, 21LR due to their relatively large cross sections. The reason for this will be explained specifically later. A sliding mechanism between the vehicle-width-direction upper rails 21UF, 21UR and the vehicle-width-direction lower rails 21LF, 21LR can be materialized by using a known bearing mechanism, and accordingly their detailed descriptions and drawings are omitted here.

Next, an attaching structure of the second row seat 2 to the vehicle-width-direction upper rails 21UF, 21UR will be described.

A seat back 2B of the second row seat 2 is supported pivotally on the rear vehicle-width-direction upper rails 21UR through a bracket 23 and a knuckle (not shown in any drawings). Namely, the seat back 2B is capable of rotating in the longitudinal direction about a pivotal portion P1. The knuckle is means which is used in a conventional seat reclining mechanism, and it can be materialized by using a known structure capable of locking and unlocking the seat back at any positions. Accordingly, detailed descriptions and drawings of the knuckle are omitted here. Herein, a passenger operates the knuckle for unlocking and move the seat back 2B forward to fold it. As described above, since the rear vehicle-width-direction lower rail 21LR is located in a higher position than the front vehicle-width-direction lower rail 21LF, a supporting mechanism comprising the bracket 23 which includes the pivotal portion P1 for supporting the seat back 2B is made as smaller as possible. Namely, the location of the pivotal portion P1 of the seat back 2B becomes relatively high in order to adopt the structure in which the seat back 2B is folded on a seat cushion 2C. Accordingly, if the rear vehicle-width-direction lower rail 21LR is located in the same level position as the front vehicle-width-direction lower rail 21LF, the bracket 23 needs to have a large scale in the vertical direction. Herein, since the bracket 23 is formed so small as not to limit a free designing of the seat 2, the seat 2 can be designed properly for the comfortable sitting of the seat.

One end portion (pivotal portion P2) of a bracket 24 is supported pivotally on a side portion of a frame of the seat back 2B which is located above the above-described pivotal portion P1. Meanwhile, the other end of the bracket 24 is coupled to a rear portion of the seat cushion 2C. Connection between the bracket 24 and the seat cushion 2C, specifically a rear portion of a cushion frame 2CF are provided by bolts located at two different positions without providing any relative movement between them.

Herein, a cover is provided at the side portion of the second row seat 2 to prevent the brackets 23, 24, 29 from being seen from outside, which is not shown in FIG. 2.

Meanwhile, a bottom face of a front portion of the seat cushion 2C of the second row seat 2 is connected to an upper face of the front vehicle-width-direction upper rail 21UF through linkage mechanisms 25, 25. The linkage mechanisms 25, 25 are provided to guide the front portion of the cushion frame 2CF such that a back face of the seat back 2B is in a substantially horizontal position, facing upward, according to a forward and downward movement of the seat cushion 2C when the seat back 2B has been folded, which are attached on the bottom face of the front portion of the second row seat 2 at two separate positions which are away from each other in the vehicle width direction.

Namely, since the seat back 2B and the seat cushion 2C are connected as described above, the seat cushion 2C is moved forward and downward according to the forward movement of the seat back 2B to be folded. A bottom face of the seat cushion 2C, namely a portion lower than the cushion frame 2CF of the seat cushion 2C hardly affect any comfortable sitting for the passenger on the seat 2. Therefore, no cushion material is provided in this area and there is provided a recess portion 27 at the bottom face of the seat (not shown in FIG. 2). Accordingly, the seat cushion 2C can be moved further downward, and therefore in the event that the seat back 2B is moved forward to be folded and then the seat cushion 2C is moved forward and downward, the face formed by the back face of the seat back 2B can be located in a lower and substantially horizontal position, without any interference of the seat cushion 2C with the front vehicle-width-direction sliding mechanism 21.

Next, an arrangement of the second row seat 2, specifically a movement of the second row seat 2 during the forward movement of the seat back 2B, will be described referring to a schematic side view of the second row seat 2 of FIG. 3(a) and (b). Only the pivotal portion P1 is illustrated in FIG. 3, omitting the bracket 23 supporting pivotally the seat back 2B. The seat back frame is not illustrated in this drawing either.

FIG. 3(a) is the schematic side view of the second row seat 2 which is in a sitting position, namely in a position where a passenger is capable of sitting on it. Herein, the seat cushion 2C is in a substantially horizontal position where its sitting face, namely its side with the cushion material faces upward, and the seat back 2B is in a substantially upright position where it stands from the rear end of the seat cushion 2C.

The seat cushion 2C moves forward and downward by operating the seat back 2B to move forward from this position. Namely, when the seat back 2B is rotated about the pivotal portion P1 (as shown with an arrow (i) of FIG. 3(a)), the seat cushion 2C also moves forward and downward (as shown with an arrow (ii) of FIG. 3(a)) according to the pivotal portion P2 moving forward and downward during the forward movement of the seat back 2B because the bracket 24 fixed to the seat cushion 2C at its one end is supported pivotally on the seat back 2B at its other end. Since the front end of the seat cushion 2C is supported by the linkage mechanisms 25, 25 as described above and allowed to move forward and downward, the seat cushion 2C can move forward and downward stably according to the forward movement of the seat back 2B.

FIG. 3(b) shows the seat back 2B in its forward-moved position, namely in its folded position. As shown in FIG. 3(b), the back face of the seat back 2B has its relatively low and substantially horizontal position. Generally, a seat for vehicles is configured such that its front portion is made thicker for providing a passenger with properly comfortable sitting. This may require a rather complex mechanism, such as a double-hinged mechanism, which is interposed between the seat cushion and the seat back, in order to make the back face of the seat back substantially horizontal when the seat back has been moved forward without moving the seat cushion. According to the present embodiment, however, since the seat back 2B and the seat cushion 2C are connected as described above, the seat cushion 2C can be moved forward and downward according to the forward movement of the seat back 2B and the back face of the seat back 2B can form a lower and horizontal face along with a simpler structure and an easy operation. Further, since there is provided only the bracket 24 for connecting the seat cushion 2C at the end of the seat cushion 2C and the linkage mechanisms 25, 25 are displaced at the front end of the seat cushion 2C, further lower and horizontal face of the back face of the seat back 2B can be formed by the back face of the seat back 2B along with further simple structure and easy operation without decreasing the thickness of the rear end of the seat cushion 2C improperly.

Figure 3:
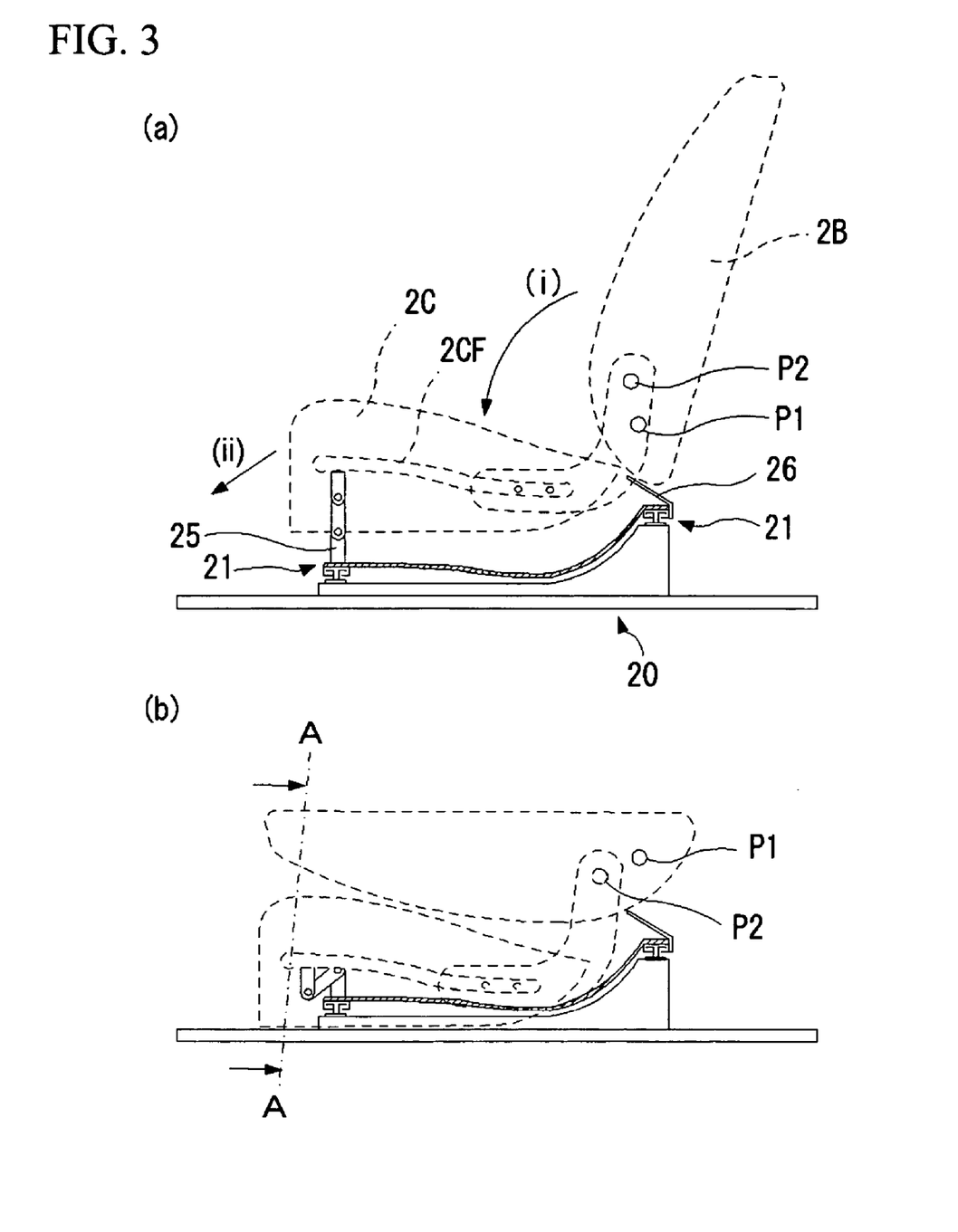
Figure 4:
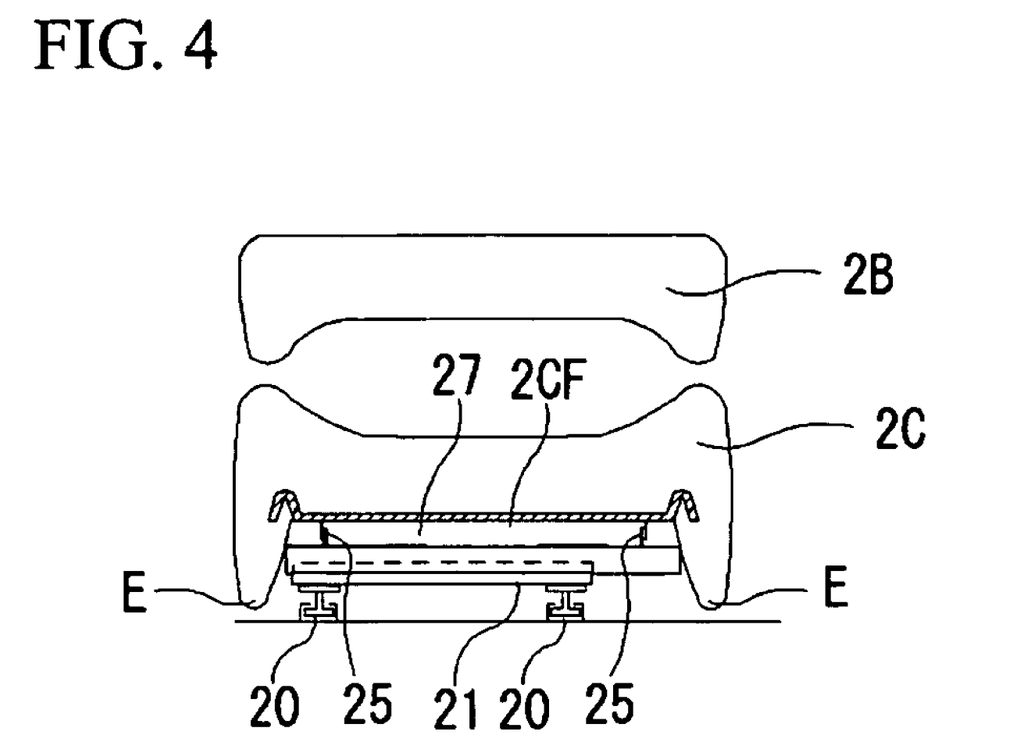
FIG. 4 is a schematic diagram for showing a cross section taken on line A—A of FIG. 3(b).

Further, as shown in FIG. 4 which is a schematic diagram for showing a cross section taken on line A—A of FIG. 3(b), a recess portion 27 is formed at a bottom face of the seat cushion 2C (a space formed from a lower end E toward a portion where the cushion frame 2CF is exposed in FIG. 4). Namely, the cushion material of the seat cushion 2C is provided substantially only above a frame body of the seat cushion 2C, and the cushion frame 2CF is exposed at the bottom face of the seat cushion 2C and the above-described linkage mechanisms 25, 25 are fixed directly to the bottom face. Further, the length of the vehicle-width-direction sliding mechanism 21 in the vehicle width direction is set shorter than a width of the recess portion 27 so as to allow the sliding mechanism 21 to guide the second row seat 2 within this range. Accordingly, in the event that the second row seat 2 is arranged to be in the position shown in FIG. 3(b), the vehicle-width-direction sliding mechanism 21 can be located always in the recess portion 27 formed at the bottom face of the seat cushion 2C regardless of where the second row seat 2 is located in the vehicle width direction. Thus, the back face of the seat back 2B forming substantially horizontal face in the above-described seat arrangement position can be located in a lower position. As described above, since the comfortable sitting of the second row seat 2 is influenced by the cushion material disposed above the cushion frame 2CF basically, the recess portion 27 formed at the bottom face of the seat does not deteriorate any comfortable sitting of the seat. Further, since the recess portion 27 needs to be formed at the bottom face of the seat cushion 2C so as to accommodate only the front vehicle-width-direction sliding mechanism 21, there is no need to form the recess portion 27 at the rear portion of the seat cushion 2C which may influence the comfortable sitting of the seat. Accordingly, enough comfortable sitting of the seat cushion 2C can be maintained.

Herein, a headrest usually used for the vehicle seat is not illustrated in FIGS. 2 and 3. The headrest is attached on an upper portion of the seat back in the sitting position as known well. However, the headrest is configured to be detachable so that it can be detached so as not to interfere with the first row seat 1 when the seat back is moved forward to be holed like the present embodiment.

The second row seat 2 of the present embodiment is capable of installing the child seat through the anchor. Hereinafter, the anchor for attaching the child seat will be described again referring to FIG. 2.

Herein, the anchor 26 for attaching the child seat, which is conventionally known as so-called ISO-FIX based on the ISO standard, is located in a gap between the seat cushion 2C and the seat back 2B when the second row seat 2 is in the sitting position. Any child seat of ISO-FIX is capable of being installed on the second row seat 2 through the anchor 26 and a seat belt not illustrated here.

The anchor 26, which is made of metal, is attached to the rear vehicle-width-direction upper rail 21UR by welding. More specifically, it is welded to attach to the back face of the rear upper rail 21UR and curves forward with respect to the second row seat 2, so that it is located in the gap between the seat cushion 2C and the seat back 2B when the second row seat 2 is in the sitting position. There are provided, as illustrated, a pair of anchors 26, 26 which are located away from each other in the vehicle width direction and attached respectively for the right and left seats of the second row seat 2. Also, these are provided so as not to interfere with the second row seat 2 when the second row seat 2 is arranged in a way described above. Accordingly, even in the event that the child seat has been fixed to the anchor, the child seat can slide along with the second row seat 2 in the vehicle width direction, without preventing the second row seat 2 from sliding in the vehicle width direction.

As described above, the anchor 26 is welded to the back face of the rear upper rail 21UR, and the upper rail 21UR has its large cross section for receiving the lower rail 21LR with enough rigidity. Accordingly, it can provide its large load resistance against the load applied to the child seat installed. Also, since the anchor 26 is welded to the back face of the upper rail 21UR and the front and rear upper rails 21UF, 21UR are interconnected, the load resistance against the forward load applied to the child seat can be enhanced. Further, since the upper rail 21UR is formed such that its cross section is of a substantially rectangular shape with its longer lateral side as illustrated, it can provide higher load resistance against the load occurring in the longitudinal direction of the vehicle, compared with an upper rail whose cross section is of a substantially rectangular shape with its longer vertical side, thereby improving the load resistance more.

Figure 5:
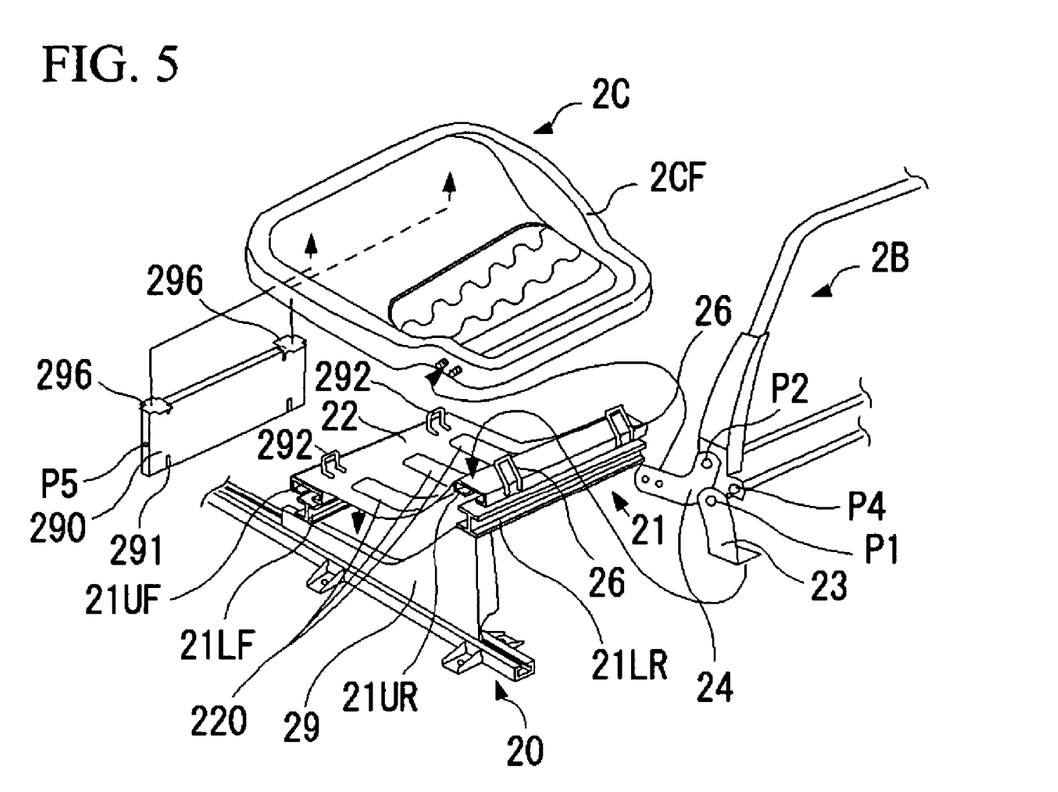
FIG. 5 is an exploded perspective view according to another preferred embodiment, which corresponds to FIG. 2.
Figure 6:
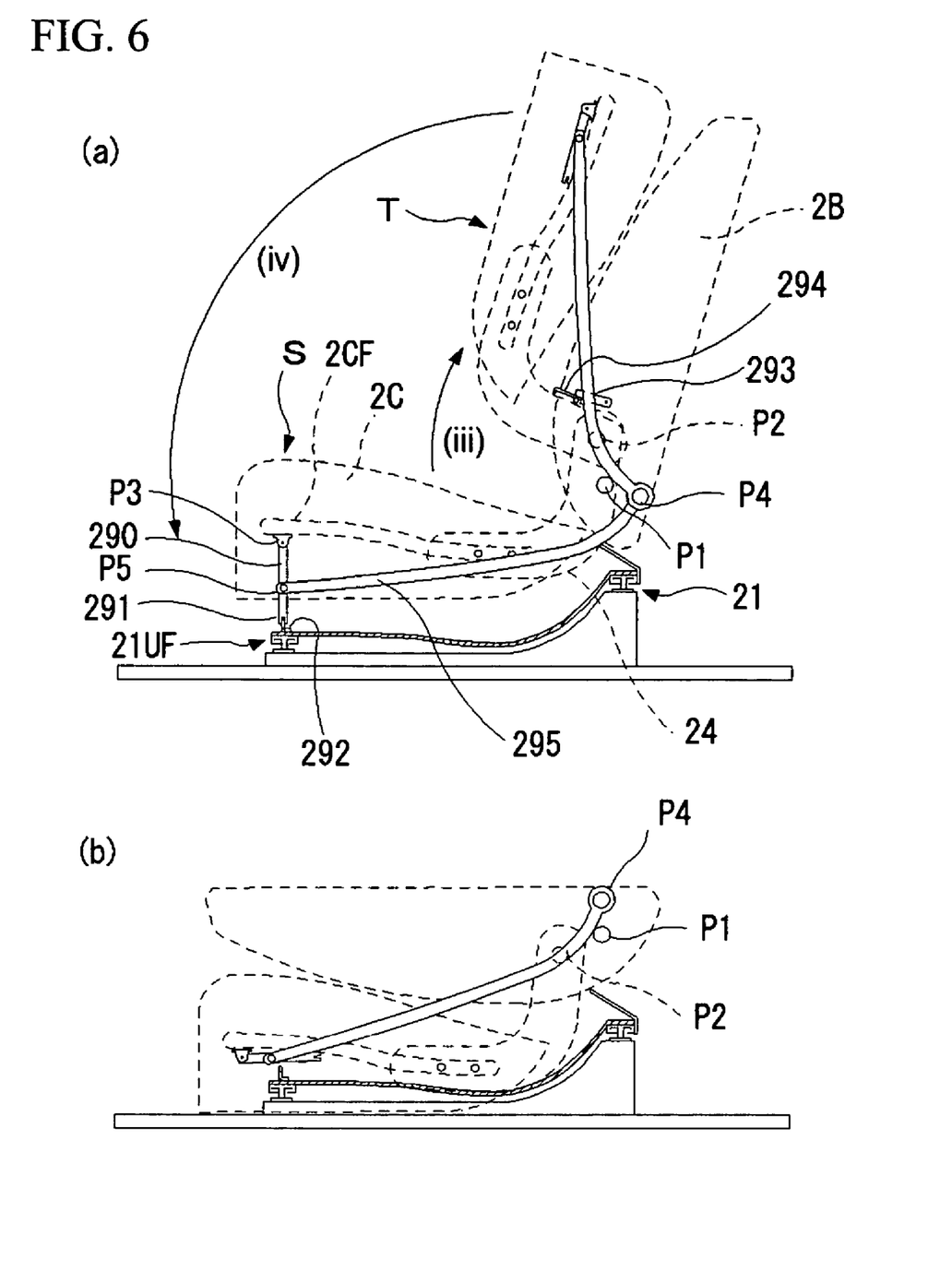

Meanwhile, instead of the above-described structure, there may be provided a structure in which the front portion of the seat cushion 2C is detachable from the vehicle body, concretely from the front vehicle-width-direction upper rail 21UF and the seat cushion 2C is capable of rotating upward around its rear end. Hereinafter, such structure will be described as a second embodiment of the present invention referring to FIGS. 5 through 7. In FIGS. 5 through 7, the same structure as the above-described first embodiment are denoted by the same reference numerals and the different structure and their functions and effects will be described mainly.

FIG. 5 is an exploded perspective view according to the second embodiment, which corresponds to FIG. 2. In the first embodiment, the lower bottom face of the front portion of the seat cushion 2C is fixed to the upper face of the front vehicle-width-direction upper rail 21UF through the linkage mechanisms 25, 25. Here in the second embodiment, the lower bottom face is fixed to the upper face of the front upper rail 21UF through a support 290 which is detachable from the front upper rail 21UF. Further, the pivotal portion P4 formed on the seat back frame and a pivotal portion P5 formed on the support 290 are interconnected through a linkage 295 which is omitted to be illustrated in FIG. 5. A structure and an effect of the linkage 295 will be described referring to FIG. 6.

The support 290 is fixed to the bottom face of the seat cushion 2C through supporting portions 296, 296 including a pair of pivotal portions P3, P3 which are disposed away from each other in the vehicle width direction (not shown in FIG. 5). There are also provided a pair of latches 291, 291 at an end of the support 290 which is opposite to its end fixed to the seat cushion 2C, and the latches 291, 291 are capable of engaging with a pair of strikers 292, 292 formed on the upper face of the front upper rail 21UF. Accordingly, the front portion of the seat cushion 2C is fixed to the upper face of the upper rail 21UF through the latches 291, 291 and the strikers 292, 292. Herein, the latches 291, 291 are capable of being locked and unlocked with the corresponding strikers 292, 292 by an operating portion not illustrated here.

Next, an upward movement of the seat cushion 2C will be described referring to FIG. 6(*a*). When the seat cushion 2C is in a sitting position illustrated with reference numeral S in FIG. 6(*a*), the front portion of the seat cushion 2C is fixed to the front upper rail 21UF through the support 290, latches 291, 291 and strikers 292, 292. Meanwhile, the rear portion of the seat cushion 2C is pivotally supported on the seat back 2B, which is the same as the first embodiment and therefore its detailed description is omitted here. On the other hand, when the seat cushion 2C is in an upward-moved position shown with reference numeral T in FIG. 6(*a*), the latches 291, 291 of the support 290 are unengaged with and away from the strikers 292, 292 and the seat cushion 2C is rotated about the pivotal portion P2 and moved upward and backward (as shown with an arrow (iii) of FIG. 6(*a*)). Finally, the seat cushion 2C and the seat back 2B take their positions in which the both are substantially contacted to each other.

The support 290 is, as described above, pivotally supported at the bottom face of the seat cushion 2C and coupled to the seat back 2B through the linkage 295. Namely, the linkage 295 is connected respectively to the side portion of the support 290 and the side portion of the seat back frame thorough the pivotal portions P5 and P4. In the event the seat cushion 2C is in the upward-moved position illustrated with reference numeral T in FIG. 6(*a*), the linkage 295 guides the support 290 so that the support 290 can be folded and not protrude from the bottom face of the seat cushion 2C. The linkage 295 is formed in a curved shape so as to correspond to profile of the seat cushion 2C and the seat back 2B, when viewed from the side of the second row seat 2. Accordingly, the linkage 295 is covered by a seat cover and does not influence adversely the comfortable sitting for the passenger as described bellow.

Also, the upward-moved position of the seat cushion 2C can be maintained by engaging a lock 293 which is pivotally supported on the seat back frame not illustrated with a striker 294 which is disposed at the bracket 24.

Herein, the brackets 23, 24, the linkage 25, the lock 293, the striker 294 and so on are covered by the seat cover disposed at the side of the second row seat 2 like the first embodiment, so as not to be seen from outside. An illustration of the seat cover is omitted here.

The seat is changed in its position from the upward-moved position illustrated with reference numeral T in FIG. 6(*a*) to the position where the back face of the set back 2B is used as the load floor, namely to the position corresponding to the folded position in the first embodiment by rotating the seat cushion 2C and the seat back 2B integrally forward about the pivotal portion P1 (as shown with an arrow (iv) of FIG. 6(*a*)). The state is shown in FIG. 6(*b*). The recess portion 27 is formed at the lower face of the seat cushion 2C like the first embodiment, and additionally the linkage 295 interconnects the seat back 2B with the support 290. Accordingly, when the seat back 2B and the seat cushion 2C are moved forward integrally to be folded, the support keeps its folded position. Thus, as illustrated, the space remains below the seat cushion 2C in the folded position and therefore the seat cushion 2C may not interfere with the front vehicle-width-direction sliding mechanism 21. As a result, the low and substantially horizontal face can be formed by the back face of the seat cushion 2B.

Steps of moving the second row seat 2 from its sitting position to its folded position are as follows. Firstly, the passenger operates the operating portion not illustrated to release the latch 291 at the support 290 from the striker 292 at the front upper rail 21UF, and then moves the seat cushion 2C backward and upward and maintains it in its upward-moved position by engaging the lock 293 at the seat back 2B with the striker 294 at the bracket 24. Then, the lock between the seat back 2B and the bracket 23 is released by operating the knuckle not illustrated, and the seat back 2B and the seat cushion 2C are integrally moved forward. Accordingly, the second row seat 2 is placed in its folded position. Namely, the second row seat 2 takes its folded position via its upward-moved position after its sitting position.

As obvious from the above description, the seat cushion 2C can be maintained in its upward-moved position. Namely, the second embodiment enables the seat arrangement of the second row seat 2 which provides a state where the seat cushion 2C is in its sitting position and the passenger can sit on it, and a state where the portion at which the seat cushion 2C has been located is used as a load compartment after the upward movement of the seat cushion 2C. Further, since the rear vehicle-width-direction sliding mechanism 21 is connected to the seat back 2B, the upper rail 21UR and the lower rail 21LR as the rear vehicle-width-direction sliding mechanism 21 are located just below the seat back 2B when the seat cushion 2C is in its upward-moved position. Accordingly, the upper and lower rails 21UR, 21LR are not located at the space which is in front of the second row seat 2 in its upward-moved position, thereby providing a large variety of space usage and improving the utility.

Herein, the latch 291 on the support 290 can be materialized by using conventional latch mechanisms using for detachable seats, such as one disclosed in Japanese Laid-Open Patent Publication No. 2000-6698.

Although some preferred embodiments of the present invention have been described above, of course the present invention should not be limited to these embodiments and any other modifications may be applied within the scope of a sprit of the invention.

What is claimed is:

1. A sear structure for a vehicle comprising:
   a seat disposed in a passenger compartment of the vehicle and including a seat cushion and a seat back, the seat being configured such that the seat back is capable of being folded on the seat cushion with its back facing upward;
   a vehicle-width-direction sliding mechanism disposed below said seat and guiding said seat so as to allow said seat to slide in a vehicle width direction, the vehicle-width-direction sliding mechanism comprising a pair of slide rails extending in the vehicle width direction respectively, which are disposed away from each other in a vehicle longitudinal direction, each slide rail comprising a lower rail and an upper rail;
   a vehicle-longitudinal-direction sliding mechanism guiding said vehicle-width-direction sliding mechanism so as to allow said vehicle-width-direction sliding mechanism to slide in a vehicle longitudinal direction in the passenger compartment of the vehicle, the vehicle-longitudinal-direction sliding mechanism comprising a pair of slide rails extending in the vehicle longitudinal direction respectively, which are disposed away from each other in the vehicle width direction, the slide rails of the vehicle-longitudinal-direction sliding mechanism guiding the lower rails of the slide rails of said vehicle-width-directior sliding mechanism, wherein said seat is configured so as to be guided in both vehicle width direction and vehicle longitudinal direction by said vehicle-width-direction sliding mechanism and said vehicle-longitudinal-direction sliding mechanism;
   a recess portion farmed at the bottom face of the seat cushion of said seat; and
   a moving mechanism disposed between said seat and said vehicle-width-direction sliding mechanism and moving the seat cushion of said seat forward and downward according to a movement of the seat back to be folded on the seat cushion,
   wherein a front slide rail of said vehicle-width-direction sliding mechanism, which is one of said pair of slide rails of the vehicle-width-direction sliding mechanism that is located on a front side, is configured such that a lateral length thereof is set shorter than a width of said recess portion in the vehicle width direction, whereby the front slide rail of said vehicle-width-direction sliding mechanism can be placed within said recess portion when the seat cushion of said seat has been moved forward and downward by said moving mechanism.

2. The seat structure for a vehicle of claim 1, wherein said seat back of the seat is supported pivotally at a pivotal portion fixed to said vehicle-width-direction sliding mechanism so as to allow said seat back to be folded on the seat cushion with its back facing upward, said seat cushion of the seat is supported pivotally on a portion of said seat back which is located above said pivotal portion, thereby moving said seat cushion of the seat forward and downward according to the movement of the seat back to be folded on the seat cushion, and a linkage mechanism guiding said downward-and-forward movement of the seat cushion is interposed between said bottom face of the seat cushion and said vehicle-width-direction sliding mechanism.

3. The seat structure for a vehicle of claim 1, wherein said seat cushion of the seat is configured to be detachable from said vehicle-width-direction sliding mechanism and supported pivotally at a rear end portion thereof so as to move upward about its rear end portion, and said seat is configured such that said seat cushion takes further a substantially contacted position with said seat back when being moved upward about the rear end portion and being in a substantially upright position.

4. The seat structure for a vehicle of claim 1, wherein a rear slide nil of said vehicle-width-direction sliding mechanism, which is one of said pair of slide rails of the vehicle-width-direction sliding mechanism that is located on a rear side, supports said seat back of the seat so as to allow the seat back to be folded on the seat cushion.

5. The seat structure for a vehicle of claim 1, wherein the upper rail of a rear slide rail of said vehicle-width-direction sliding mechanism, is one of said pair of slide rails of the vehicle-width-direction sliding mechanism that is located on a rear side, has a U-shaped cross section opening downward, and an anchor for attaching a child seat is fixed to the upper rail of the rear slide rail of said vehicle-width-direction sliding mechanism.

6. The seat structure for a vehicle of claim 5, wherein said upper rail of the rear slide rail is formed such that its cross section is of a substantially rectangular shape with its longer lateral side, and said anchor for attaching the child seat is fixed to a back face of said upper rail.

7. The seat structure for a vehicle of claim 5, wherein a connecting member is provided to connect the upper rail of said front slide rail of the vehicle-width-direction sliding mechanism with the upper rail of said rear slide rail of the vehicle-width-direction sliding mechanism.

8. A seat structure for a vehicle comprising:
   a seat disposed in a passenger compartment of the vehicle and including a seat cushion and a seat back, the seat being configured such that the seat back is capable of being folded on the seat cushion wit its back facing upward;
   a front vehicle-width-direction sliding mechanism and a rear vehicle-width-direction sliding mechanism which are disposed away from each other in a vehicle longitudinal direction below said seat and guide said seat so as to allow said seat to slide in a vehicle width direction, each of the front and rear vehicle-width-direction sliding mechanisms comprising a slide rail extending in a vehicle width direction, each slide rail comprising a lower rail and an upper rail;
a vehicle-longitudinal-direction sliding mechanism guiding said front and rear vehicle-width-direction sliding mechanisms so as to allow said front and rear vehicle-width-direction sliding mechanisms to slide in the vehicle longitudinal direction in the passenger compartment of the vehicle, the vehicle-longitudinal-direction sliding mechanism comprising a pair of slide rails extending in the vehicle longitudinal direction respectively, which are disposed away from each other in the vehicle width direction, the slide rails of the vehicle-longitudinal-direction sliding mechanism guiding the lower rails of the slide rails of said front and rear vehicle-width-direction sliding mechanisms, wherein said seat is configured so as to be guided in both vehicle width direction and vehicle longitudinal direction by said front and rear vehicle-width-direction sliding mechanisms and said vehicle-longitudinal-direction sliding mechanism;
a pivotal portion fixed to said rear vehicle-width-direction sliding mechanism and supporting pivotally the seat back of said seat so as to allow the seat back to be folded on the seat cushion with its back facing upward;
a rotational supporting portion supporting pivotally the seat cushion of said seat, which is located above said pivotal portion of the seat back of said seat;
a connecting portion connecting detachably the seat cushion of said seat with said front vehicle-width-direction sliding mechanism, which is interposed between the seat cushion and said front vehicle-width-direction sliding mechanism,
wherein said seat is configured such that the seat cushion takes further a substantially contacted position with the seat back when being moved upward about said rotational supporting portion and being in a substantially upright position while said connecting portion allows the seat cushion to be detached from said front vehicle-width-direction sliding mechanism.

9. The seat structure for a vehicle of claim 8, wherein a connecting member is provided to connect the upper rail of said front vehicle-width-direction sliding mechanism with the upper rail of said rear vehicle-width-direction sliding mechanism.

10. The seat structure for a vehicle of claim 9, wherein said front and rear vehicle-width-direction sliding mechanisms are guided by said vehicle-longitudinal-direction sliding mechanism so as to slide in the vehicle longitudinal direction in a state in which said rear vehicle-width-direction sliding mechanism is located higher than said front vehicle-width-direction sliding mechanism and a space is formed between said rear vehicle-width-direction sliding mechanism and a vehicle floor in the passenger compartment.

11. The seat structure for a vehicle of claim 8, wherein said front and rear vehicle-width-direction sliding mechanisms are guided by said vehicle-longitudinal-direction sliding mechanism so as to slide in the vehicle longitudinal direction in a state in which said rear vehicle-width-direction sliding mechanism is located higher than said front vehicle-width-direction sliding mechanism and a space is formed between said rear vehicle-width-direction sliding mechanism and a vehicle floor in the passenger compartment.

12. The seat structure for a vehicle of claim 8, wherein the upper rail of said rear vehicle-width-direction sliding mechanism has a U-shaped cross section opening downward, and an anchor for attaching a child seat is fixed to the upper rail of said rear vehicle-width-direction sliding mechanism.

13. The seat structure for a vehicle of claim 12, wherein said upper rail is formed such that its cross section is of a substantially rectangular shape with its longer lateral side, and said anchor for attaching the child seat is fixed to a back face of said upper rail.

14. The seat structure for a vehicle of claim 12, wherein a connecting member is provided to connect the upper rail of said front vehicle-width-direction sliding mechanism with the upper rail of said rear vehicle-width-direction sliding mechanism.

* * * * *